June 2, 1936.  C. H. SCHURR  2,043,012
HOBBING MACHINE FEEDING MECHANISM
Filed Jan. 2, 1930  3 Sheets-Sheet 1
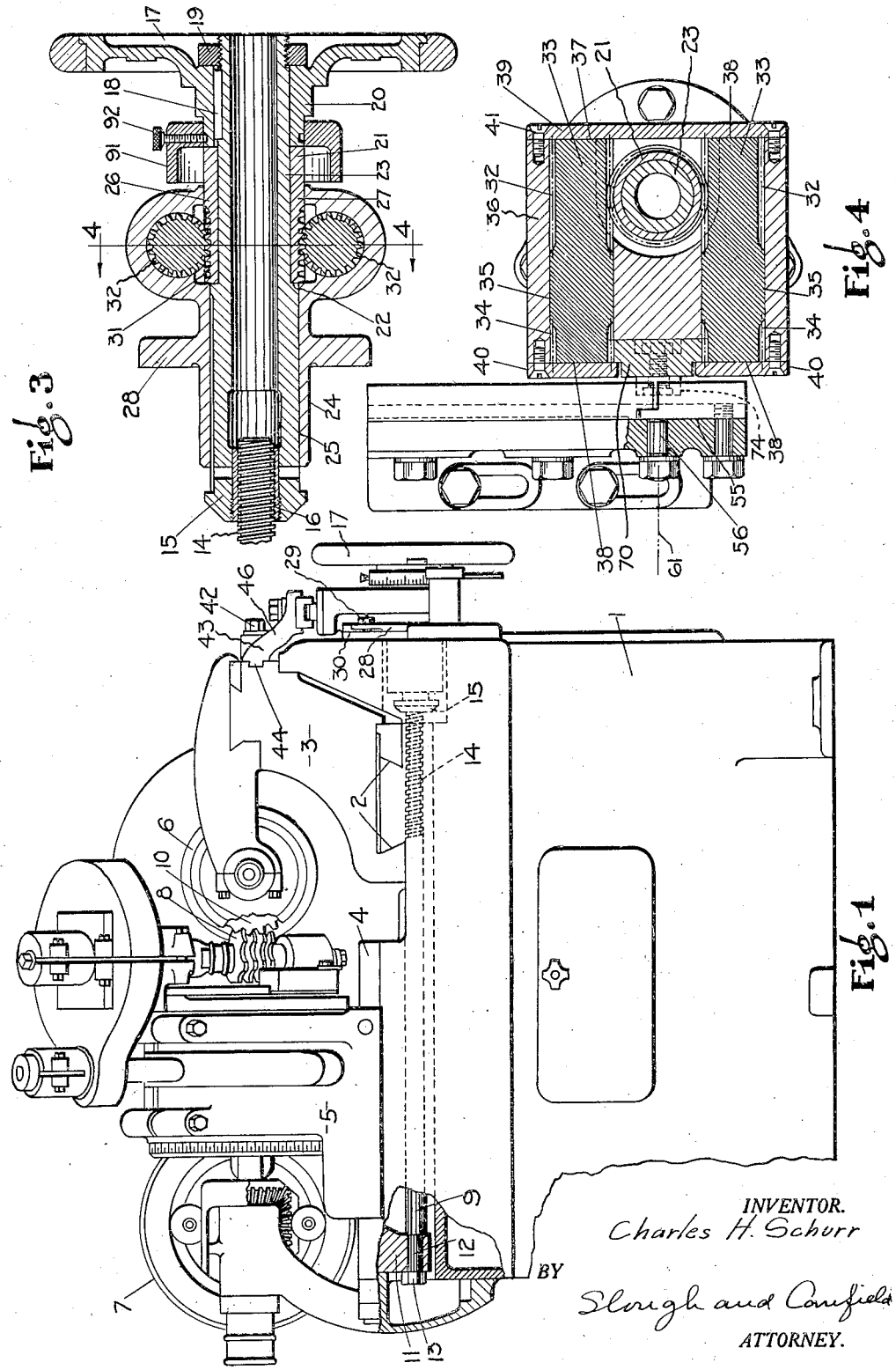
INVENTOR.
Charles H. Schurr
BY
Slough and Canfield
ATTORNEY.

June 2, 1936.  C. H. SCHURR  2,043,012
HOBBING MACHINE FEEDING MECHANISM
Filed Jan. 2, 1930  3 Sheets-Sheet 2
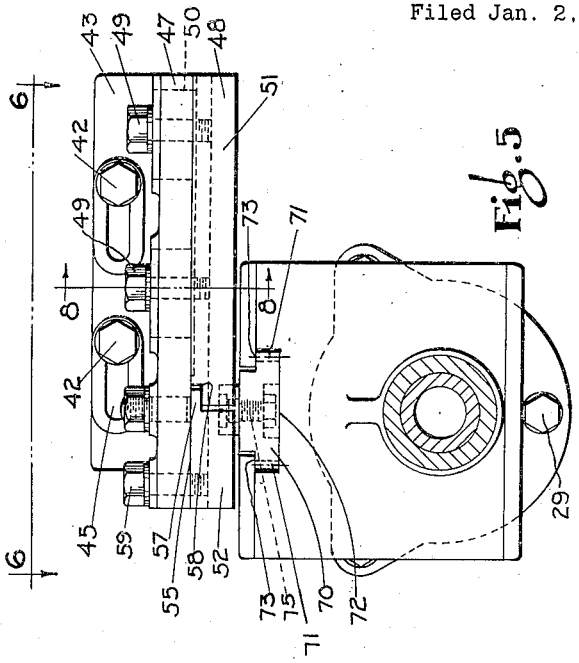
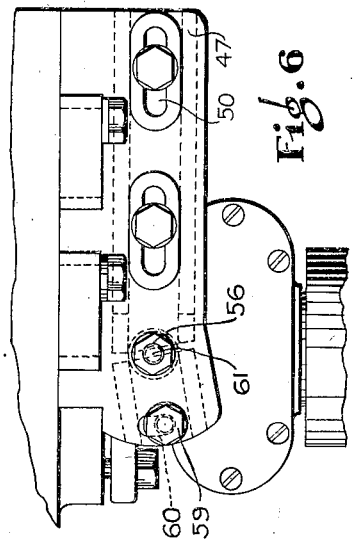
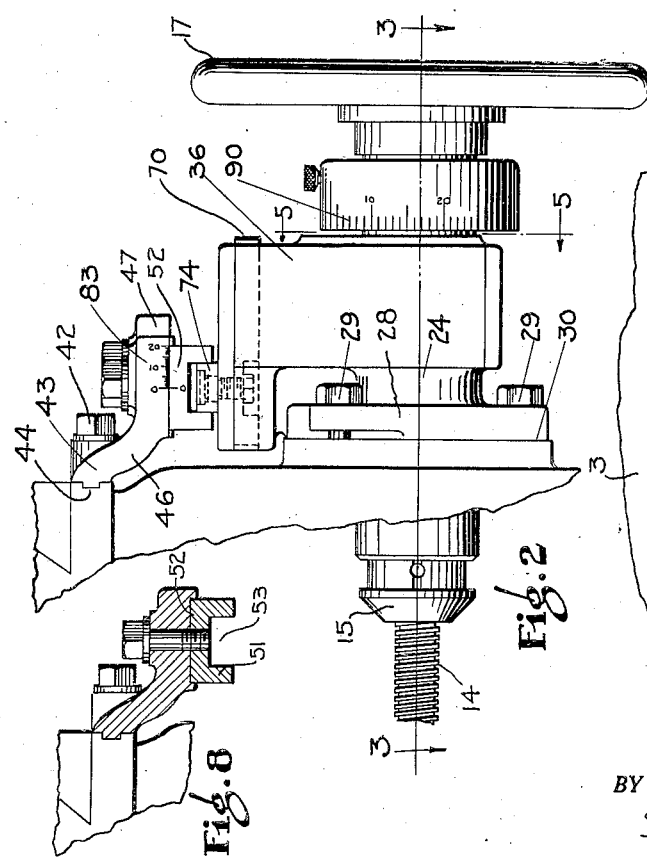
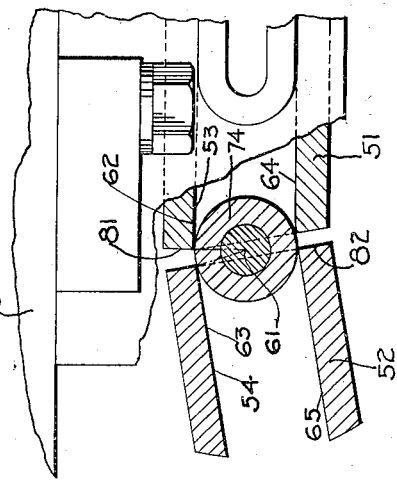
INVENTOR.
Charles H. Schurr
BY
Slough and Canfield
ATTORNEY.

June 2, 1936.  C. H. SCHURR  2,043,012
HOBBING MACHINE FEEDING MECHANISM
Filed Jan. 2, 1930  3 Sheets-Sheet 3
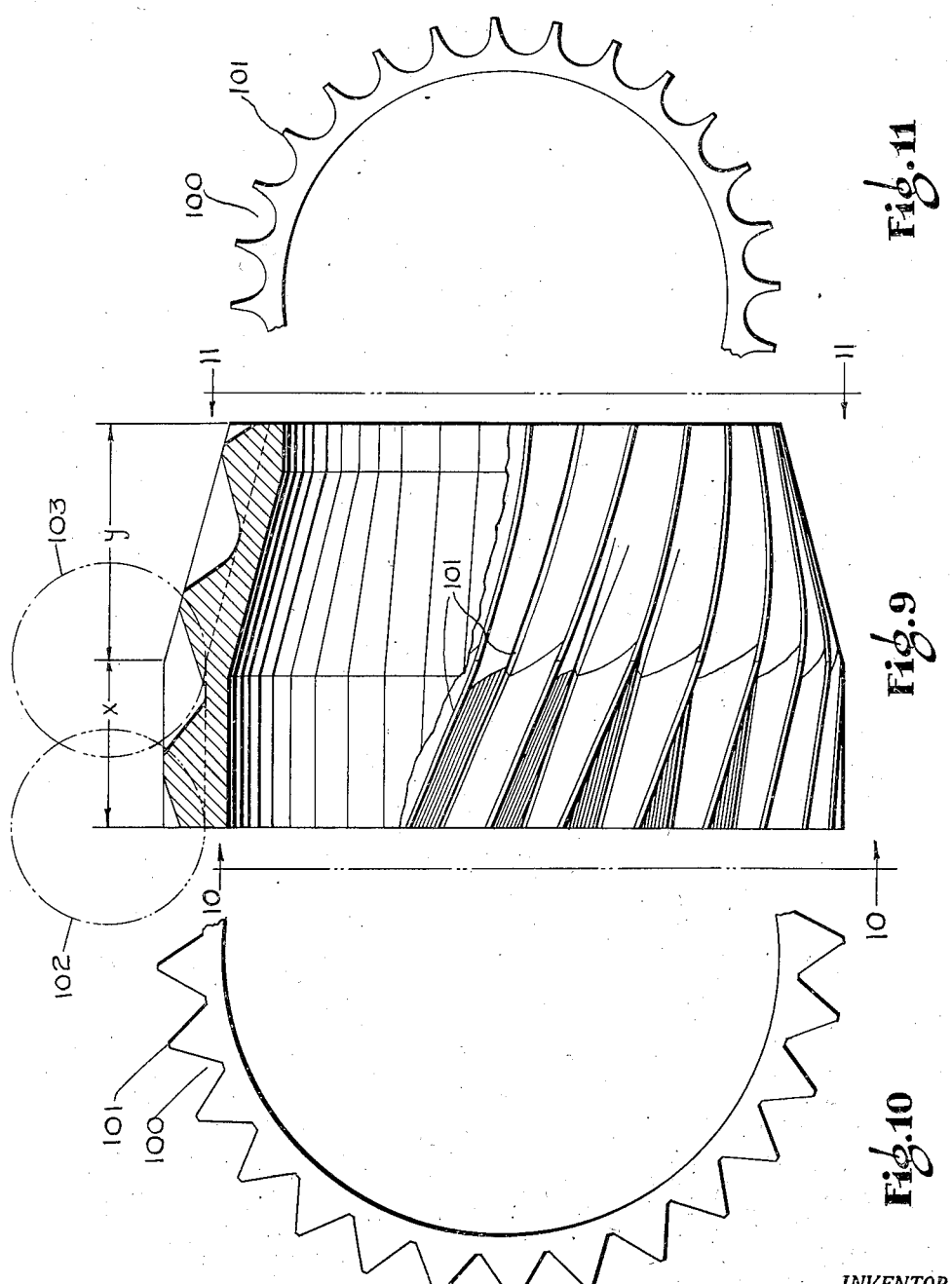
INVENTOR.
Charles H. Schurr
BY
Slough and Caufield
ATTORNEY.

Patented June 2, 1936

2,043,012

UNITED STATES PATENT OFFICE 2,043,012

HOBBING MACHINE FEEDING MECHANISM

Charles H. Schurr, Cleveland, Ohio, assignor to The Lees-Bradner Company, Cleveland, Ohio, a corporation of Ohio Application January 2, 1930, Serial No. 417,846

4 Claims. (Cl. 90—4)

This invention relates to hobbing machines and particularly to hobbing machine mechanisms for automatically controlling and varying the depth of cut of the hob in the work piece.

In the simple operation of hobbing, such for example as that performed in cutting teeth on spur gears, the hob and the work piece are usually set with the hob at a suitable predetermined depth position, so that upon giving lead movement to the work piece or relative lead movement between the work piece and the hob, the hob will make cuts in the work piece which, longitudinally of the work piece, are of uniform transverse depth.

In performing some hobbing operations, however, it is desirable gradually to feed the hob deeper into the work piece or gradually to retract it therefrom concurrently with the lead movement; and this invention relates to mechanisms for performing such an operation.

Again, it is sometimes desirable to perform a hobbing operation in which the said in-feed or out-feed movement of the hob relative to the work concurrently with the lead movement occurs during only a part of the total lead movement thus producing as a result a work piece on a part of which the hobbing operation is of uniform depth and on another part of which it is of increasing or decreasing depth.

Again, in performing hobbing operations, it is sometimes desirable that the hob may have in-feed or out-feed concurrently during all or part of the lead movement to produce articles which taper throughout their length axially considered or over a part of their length.

As is well known, hobbing machines, generally, are provided in the power transmission to the tool support and work support with change gears by which the relative speeds of rotation of the hob and of the work may be varied and whereby, if desired, the hob may cut teeth or grooves in the work piece which follow generally helical directions around the work piece, and, in some hobbing operations it is desirable that the hob and work may have the above mentioned relative in-feed or out-feed movement going on concurrently during all or a part of the lead movement while the hob is performing a helical cutting operation.

As will appear hereinafter, my invention comprises, preferably, an attachment for existing types of hobbing machines to adapt the machine to perform hobbing operations such as those referred to above, although the elements of my invention may, of course, be structurally embodied as a part of the hobbing machine proper; and whereas all of the above mentioned operations may be performed on a hobbing machine embodying my invention, particular reference is made hereinafter to the application of my invention to the hobbing of articles to produce thereon generally helical cuts which, during a part of the lead movement, are on a generally cylindrical part of the article and, during another part of the lead movement, are made by concurrently feeding the tool toward or from the article to produce thereon a generally conical tapering portion, the said helical cuts being continuous over both portions.

It is, therefore, one of the objects of this invention to provide an improved mechanism for use in hobbing machines whereby the feed movement of the hob relative to the work piece may be automatically controlled and varied to make tapering cuts in the longitudinal direction of the work.

Another object is to provide a mechanism adaptable for use on hobbing machines whereby during the relative lead movement of the hob and work piece in the longitudinal direction of the work they may concurrently be fed relatively transversely of the work piece to cause the cuts made by the hob to taper, and/or to be of continuously varying depth, and during all or during a part of the relative lead movement.

Another object is to provide a mechanism adaptable for use in hobbing machines by which the hereinbefore mentioned transverse feed of the hob may be adjusted to adjust the angle of the taper cut in the work piece.

Another object is to provide a mechanism adaptable for use in hobbing machines for effecting the hereinbefore mentioned in-feed or out-feed of the hob and work relatively, which may be adjusted to vary the relative proportion of the cylindrical and tapering parts of the work.

Another object is to provide a mechanism adaptable for use in hobbing machines to effect the hereinbefore mentioned in-feed or out-feed of the hob relative to the work and in which certain elements are employed both to automatically so feed the hob and to manually adjust the feed or depth of position of the hob and with which the two said functions may be performed independently.

Another object is to provide in a hobbing machine an improved mechanism whereby hobbing cuts may be made on articles to be hobbed either generally in planes containing the work axis or in generally helical directions on the work, and which cuts in either case may be performed on cylindrical or on tapering portions of the work or both.

Another object is to provide in a hobbing machine a mechanism operative upon the relative lead movement between the work and the hob in one direction to feed the hob gradually toward the work axis during its cutting operation and upon relative lead movement in the opposite direction to automatically restore the hob to its original or initial cutting depth.

Other objects will be apparent to those skilled in the art to which this invention pertains.

My invention is fully disclosed in the following description taken in connection with the accompanying drawings, in which:

Fig. 1 is an elevational view, simplified, of a hobbing machine embodying my invention;

Fig. 2 is a fragmentary view similar to Fig. 1 drawn to a larger scale and showing particularly the parts of the machine embodying my invention;

Fig. 3 is a sectional view taken from the plane 3 of Fig. 2;

Fig. 4 is a sectional view taken from the plane 4 of Fig. 3;

Fig. 5 is an elevational view partly in cross-section taken from the plane 5 of Fig. 2;

Fig. 6 is a fragmentary plan view taken from the plane 6 of Fig. 5;

Fig. 7 is a fragmentary view similar to Fig. 6 drawn to a larger scale and with parts in cross-section;

Fig. 8 is a fragmentary sectional view taken from the plane 8 of Fig. 5;

Fig. 9 is a side elevational view of one type of work piece;

Figs. 10 and 11 are respectively end elevational views taken from the planes 10 and 11 of Fig. 9.

In the drawings, I have shown at 1 an elevational view simplified of a hobbing machine embodying my invention comprising generally a base 1 provided with longitudinal ways 2—2 upon which is slidably mounted for reciprocatory movement thereon a work support or work slide 3. The frame 1 also is provided with a pair of transverse ways 4, only one of which is shown, upon which is mounted for reciprocation thereon a tool support or tool slide 5.

Mounted upon the work slide 3 and movable bodily therewith toward and from the observer, as viewed in Fig. 1, is a work spindle, the end of which is shown in Fig. 1 at 6, and the work spindle 6 has rotational bearings on the slide 3. By gearing connections from a driven belt pulley 7, the work spindle 6 is adapted to be rotated, and by means of a lead screw, or equivalent means connected to the slide 3, the slide and the work spindle are adapted to be moved longitudinally of the work spindle.

Also, by gear connections from the belt pulley 7, a hob 8 on the slide 5 is adapted to be rotatively driven, and by means of a push and pull bar 9 connected to the slide 5, the slide and the rotating or rotatable hob thereon may be moved along the ways 4 to move the hob 8 toward or from the work spindle axis.

Thus, a work piece 10 mounted on the work spindle 6 may be engaged by the hob 8 when the hob is moved toward the work piece and the concurrent rotation of the hob, rotation of the work 10 with the work spindle 6, and the longitudinal or lead movement of the work spindle 6 will cause the hob 8 to perform the well known hobbing operation on the work piece 10.

The elements of the hobbing machine of Fig. 1 thus far referred to are all well known in the art. Some of them are not shown in Fig. 1 for this reason. It is believed, that with this brief description, however, and the showing in Fig. 1, those having a knowledge of this art will clearly understand the hobbing movements above described.

As hereinbefore referred to, in the hobbing mechanism of my invention, provision is made to move the hob 8 toward or from the work 10 to position it for cutting to the desired depth or to change its depth position while the cutting operation is going on, that is to give it in-feed or out-feed movement concurrently with the lead movement of the work, and this mechanism will now be described.

Depending from the tool slide 5 is a lug 11 to which is secured, as by a shank 12 and a nut 13, the push and pull bar 9 above referred to. The bar 9 extends transversely of the machine and at its opposite end, as indicated at 14, is screw threaded, and meshed with the threads 14 is a nut element 15, see Fig. 3. By the mechanism described below, the nut element 15 may be moved bodily longitudinally by automatic means to push or pull the bar 9 or the nut element 15 may be rotated by manual means and held against longitudinal movement to push or pull the bar 9.

The nut element 15 is generally tubular, the inner end being lined with a bushing 16 in which threads meshed with the threads 14 are cut, and upon its outer end is mounted a hand wheel 17 locked to the nut element 15 as by a key 18 to turn the element. A lock nut 19 threaded on the outer end of the nut element clamps the inner end of the hub 20 of the hand wheel 17 against a rotatable rack 21 of generally hollow cylindrical form, the inner end of which abuts upon a shoulder 22 formed on the tubular nut element 15.

Thus, by tightening the nut 19, the hand wheel hub 20, the rotatable rack 21 and the nut element 15 are all rigidly clamped together as a unit. The internal cylindrical bore of the rack 21 fits a portion of reduced diameter 23 of the nut element 15, so that the rack element 21 is maintained co-axial with the nut element 15.

To support the nut element assembly thus described and to permit of rotary movement of the nut element 15 as well as longitudinal movement thereof, a housing 24 is provided having a cylindrical bearing bore 25 in which the nut element 15 is rotatably and longitudinally mounted and having also a bore 26 coaxial therewith in which the outer cylindrical and toothless portion 27 of the rotatable rack has longitudinal and rotary movement. The housing 24 is adapted to be rigidly secured upon the frame 1 of the hobbing machine to align its above described bearing surfaces coaxially with the push and pull bar 9 by an attaching flange 28 adapted to be bolted as by bolts 29—29 to a pad or like seat 30 on the main frame 1.

The generally hollow cylindrical rotatable rack 21 besides having the smooth cylindrical portion 27 thereof, above referred to, at one axial end thereof, has on the exterior cylindrical surface adjacent to its other end a plurality of annular teeth, formed by cutting annular grooves therein of such shape that on a longitudinal cross-section, as in Fig. 3, the teeth formed thereby are of the shape and disposition of rack teeth, as shown at 31, Fig. 3.

Meshed with the rack teeth 31 are teeth 32—32 on the lower ends of a pair of elongated spur gears 33—33, the upper ends of which gears have other spur gear teeth 34—34, and the gears 33 are mounted each in a bore 35—35 axially at right angles to the axis of the rotatable rack 21 in a suitable gear housing 36 formed integrally with the housing 24 above referred to.

The gears 33 are thus free to rotate in the bores 35 and are trapped against longitudinal movement therein by the abutment of their transverse end faces 37—37 and 38—38 against corresponding end plates 39 and 40—40 secured on the housing 36 as by screws 41, 41.

As thus far described, it will be apparent that the hand wheel 17 may be turned to turn the nut element 15 to propel the bar 9 and during such operation the teeth 31 of the rotatable rack 21 will rotate meshed with the teeth 32 of the gears 33, idly, on opposite sides thereof, but without rotating the gears for a reason to be described. Also, it will be apparent that if the gears 33 are rotated in opposite directions they will react on the teeth 31 of the rotatable rack and propel the rotatable rack 21 axially and it, being rigidly connected to the nut element 15, will propel the bar 9. Means is provided to prevent rotation of the gears 33 or to rotate them in opposite directions concurrently with the lead movement of the slide 3 and rack 10, and will now be described.

In the upper part of the housing 36 and slidably disposed or supported in a way or ways 72 cut therein is a rack 70 having two sets of teeth 71—71 on opposite sides thereof meshed with the teeth 34 of the gears 33. The rack 70 is retained in its ways 72 by the plates 40, which inwardly overlap shoulders 73—73 of the rack.

On the upper side of the rack 70 is secured a roller or cam follower 74 rotatably mounted on the rack by a bolt 75. By means of a movable cam track to be described, in which the cam follower 74 is disposed, the cam follower may be moved to move the rack 70 to rotate the gears 33 to propel the bar 9, as above described; or, the cam track may hold the cam follower 74 from movement to cause the rack 70 to hold the gears 33 from rotating to permit the bar 9 to be propelled by the hand wheel 17, as above described.

The cam track above referred to is provided as follows: Upon the slide 3 is secured as by bolts 42, a bracket 43 provided with a tongue 44 engaging a suitable mating groove in the slide 3, in which it is securely held against displacement and in which it may be longitudinally adjusted, bolt slots 45 in the bracket 43 permitting its adjustment movement relative to the bolts 42.

The bracket 43 comprises a depending portion 46 having at its lower end a cam support 47 upon which a cam 48 is bolted as by bolts 49, 49, the bolts being passed through adjustment slots 50 in the cam support 47 and threaded at their lower ends into the cam 48.

The cam 48 consists generally of two parts 51 and 52. The cam part 51 is generally of the form of a rectangular bar seated in a depressed groove or seat in the cam support 47 above referred to and is provided in its lower face with a rectangular cam track 53, see Fig. 8. The parts are constructed and disposed so that the longitudinal direction of the cam track 53 in all of its adjusted positions is, in the usual application of my invention, accurately parallel with the ways 2—2 on the main frame, for a purpose to be described.

The other cam part 52 comprises an element having a downwardly open cam track 54 of the same cross-sectional shape and size as the track 53 above described and forms a continuation of the cam track 53, but the direction of the cam track 54 is adjustable by the following means. The upper face 55 of the part 52 is not dove-tailed or seated in the cam support 47 as is the cam part 51, but is slidable thereon with an adjustable rotary or oscillatory movement around the axis 61 of a stud 56 formed upon or secured to the upper face 55 of the cam part 52 and fitting rotatably in a corresponding bore or bearing in the cam support 47. A small shelf 57 on the part 52 overlaps a portion of the part 51, a suitable notch 58 being provided in the part 51 for this purpose. The part 52 may be locked in any rotated adjusted position by a bolt 59 extending through a slot 60 in the cam support 47 circularly arcuate around the axis 61 and threaded into the part 52, and by which the part 52 may be clamped against the cam support 47.

The cam track 54 is illustrated at an angular relation to the cam track 53 in Fig. 7 where is also indicated the cam follower 74, and it will now be understood that upon movement of the slide 3 on its ways 2, both cam tracks 53 and 54 will move with the slide. If, as in the preferred embodiment of my invention, the cam track 53 is parallel to the ways 2 no movement will be communicated thereby to the cam follower 74. After sufficient movement of the cam track 53 longitudinally, the cam follower 74 will enter the cam track 54 and due to its angular direction, the cam follower 74 will be moved or propelled and will move the rack 70, the movement being guided by the rack ways above described.

In order that the cam follower 74 may roll from the cam track 53 to the cam track 54 with the smooth change of direction necessary in the proper control of the hob feed, the transition must take place smoothly and without lost motion. To effect this, the side wall 63 of the adjustable cam track 54 is disposed so that the cam follower 74 may be tangential both to it and to the wall 62 of the cam track 53 simultaneously. That is, at the moment the cam follower 74 has reached a point at or adjacent to the end of the wall 62 and is tangential thereto, it is at the same moment tangential to the wall 63. This same condition, furthermore, is caused to be true at various adjustments of the cam track 54 by making the axis 61 around which the cam track is adjustably rotatable coincident with the center of the cam follower 74 when in said position of tangency to both walls 62 and 63 simultaneously.

Thus, as in Fig. 7, when the cam track 54 is adjusted clockwise around its axis 61, to the extreme possible position, the walls 62 and 63 may lie in a continuous straight line, and at other adjusted positions, the cam follower 74 will be simultaneously tangent to both walls and may roll from one to the other smoothly and exactly along a prescribed path.

During the hobbing operation, the reactions between the tool and the work piece are in the direction, as will be understood from the drawing, to hold the cam follower 74 forcibly against the walls 62 and 63 of the cam tracks, so that the accuracy of control of the hob during operation is determined by these two walls.

In this connection, therefore, it will be understood that by changing the shape or longitudinal configuration of these walls, any desired variation of control of the hob to vary its cutting depth to correspondingly vary the character of the cut in the work being made by the hob, may be effected. Furthermore, in this connection, it will be understood that the walls 64 and 65 of the cam tracks 53 and 54 respectively function primarily on the return movement of the camming tracks after the hobbing operation has been finished to restore the hob to its original position, and it is, therefore, not necessary to the proper functioning of my invention to have these walls also simultaneously tangent to the cam roller 74 in various adjusted positions of the adjustable cam track.

The adjusted position of the cam part 52 may be determined by a graduated dial on the cam support 47, as indicated at 83, Fig. 2, and a corresponding zero indication on the part 52.

The operation of my invention will now be described in connection with the hobbing of a work piece, such as shown in Figs. 9, 10 and 11. This work piece chosen for illustration is a reamer, such as may be used in reaming the drilled hole of an oil well. The blank from which the article is made is cylindrical over a portion of its longitudinal length, as at $x$ and conical for the remaining portion, as at $y$. Grooves of generally triangular cross-section are hobbed, beginning at the cylindrical end and along helical directions, the hob having suitably formed cutting teeth and the gearing connections of the hobbing machine being chosen to effect the helical hobbing operation, as will be understood by those having a knowledge of this art.

A blank, such as that required for the article of Fig. 9, having been mounted on the work spindle 6, the hob 8 may be adjustably fed toward the piece to bring it to the required initial cutting depth position, such as that indicated at 102 in broken lines in Fig. 9. This may be done by turning the hand wheel 17 to turn the tubular nut element 15 and propel the push and pull bar 9 to propel the carriage 5 on the ways 4.

With the hob in this position, the hobbing operation commences and proceeds over the portion $x$ of the article, cutting the triangular grooves 100 therein and producing the cutting, scraping or reaming edges 101 helically disposed on the article.

During this relative lead movement of the hob, the movement of the cam part 51 relative to the cam follower 74 transmits no movement to the cam follower because the cam track 53 in the cam part 51 is disposed parallel to the ways 2—2 which control the direction of movement of the work slide 3. When the relative lead movement between the hob and the work piece have relatively carried the hob to the position indicated at 103 in Fig. 9, the roller 74, due to the longitudinal adjustment of the cam track, hereinabove described, has arrived at the position indicated in Fig. 7 where it leaves the cam track 53 and enters the cam track 54. From this point on, the lead movement will cause the cam track 54 to propel the cam follower 74 and move the rack 70 toward the right in Fig. 2 and toward the observer in Figs. 4 and 5, and this will rotate the gears 33 meshed with the rack, which in turn will propel the rotatable rack 21, meshed with the gears, toward the right in Figs. 1, 2 and 3 and pull on the push and pull bar 9 to gradually feed the hob toward the axis of the work piece.

The hobbing operation thus performed on the part $y$ of the work piece continues to cut helically directed grooves therein and to continue the working edges 101 on the conical part $y$ of the work piece. The helical angle of the hobbing operation remaining constant due to the initial speed ratio adjustment of the parts of the machine and the gradually diminishing diameter of the work piece will give a slight curvature to the cutting edges 101 on the portion $y$, as indicated in Fig. 9 upon that edge 101 viewed along the medial line of the figure. Also, the shape of the grooves 100 on the portion $y$ will gradually change until at the small end of the piece their bottoms will be curved, that is the groove will be generally U-shaped.

It will be observed that after the hob has been initially adjusted to depth, thereafter throughout the hobbing operation, its depth position is rigidly controlled by the cam track 53—54 and it will therefore be apparent that at the end of the hobbing operation to return the hob to its original position it is only necessary to return the work slide 3 to its original position because the cam track 53—54 will operate both in the reverse direction of the work slide movement and in the forward direction thereof. This is one of the important and valuable features of my invention, namely that the hub does not have to be reset for depth each time to start the hobbing operation on a new work piece, but automatically takes up its correct depth position upon returning the work slide and work spindle to their position for beginning the new cut.

As a further particular advantage of my invention, the adjustments of the hob, by means of the hand wheel 17 and by the automatic operation of the cam and cam follower, the one turning the tubular nut element 15 on the threads 14 of the bar 9 and the other moving the nut element bodily longitudinally to pull upon the bar 9, are made independently of each other, but by means of a single set of parts and one does not influence the other in a manner to require compensative adjustments of one with respect to the other.

While I have shown my invention as involving a rectilinear cam track 53 and a single angularly adjustable track 54 to hob on a cylindrical portion followed by a tapering or conical portion, it will, of course, be understood that the principles of my invention may be embodied in modifications of this construction.

For example, the cam track 53 itself may be mounted on the carriage 3 at a predetermined angle with its lead direction to cut a continuous taper on the work; or again, an angularly adjustable cam track 54 may be provided on each end of the cam track 53, if desired, to cut tapering portions at each end of a cylindrical portion or at each end of a tapering portion; and the cut on the tapering portion may be made first and that on the cylindrical portion may follow it by providing a cam track 54 on the other end of the cam track 53. Also, as will be understood, the cuts made by the hob may be helical as in the particular case illustrated or they may be parallel to the axis of the work as in an ordinary spur gear. Again, if desired, the direction of the taper may be outwardly away from the axis instead of inwardly toward it by suitably directing the angularly disposed portion of the cam track.

Furthermore, although the elements of my improved mechanism may be embodied in a hobbing machine as an integral part thereof, they also are particularly adaptable to be applied to a hobbing machine of known design as an attachment therefor, thus permitting the machine to be manufactured with or without the automatic hob feeding feature.

Inasmuch as the two cam parts 51 and 52 are separately mounted on the support 47, the hob feed control mechanism may be easily and quickly adapted to various kinds and types of operation, some of which have been referred to hereinbefore, simply by changing the cam parts 51 and 52, and inasmuch as these parts are relatively simple and are on the outside of the machine in a highly accessible position, a great variety of cam parts 51 and 52 may be kept in stock for use on the machine at relatively small expense and the change from one to the other may be quickly and cheaply made.

Also, by means of the longitudinal adjustments for the cam tracks herein provided, the longitudinal point on the work piece at which it is desired that the cutting depth of the hob shall begin to vary, for example begin to taper, may be adjustably varied.

In the hobbing of articles such as that illustrated in Figs. 9, 10 and 11, it may be desired to control or predetermine the circumferential width of the cutting or reaming edges 101. This will, of course, be determined by the depth of the hobbing cut. On the cylindrical portion $x$, said width of the edge 101 will be uniform from end to end, if the portion $x$ is cylindrical, that is does not taper and if the cam track 53 is parallel to the movement of the slide carrying the work. The width of the edges 101 on the tapering portion $y$ will be affected by a number of factors including the conical angle of the tapering portion, the angle of adjustment of the cam track 54 and the diminishing radius of the work piece combined with the constant helical angle of the lead movement. In any given case, the width of the edges 101 on the tapering portion $y$ may be controlled either to maintain the width uniform from end to end of the portion $y$ or to cause it to vary, by adjusting the angle at which the cam track 54 is set and/or by varying the longitudinal configuration of the wall 63 thereof and this flexibility of production result is one of the important advantages of my invention.

My invention is not limited to the exact details of construction shown and described. Changes and modifications other than those referred to hereinbefore may be made within the scope of my invention.

I claim:

1. In a hobbing machine, a work support, a work spindle on the support adapted to support a work piece, a tool support, a tool spindle on the tool support, a tool on the tool spindle, the tool and work spindles being adapted to be rotated at a relative velocity ratio suitable for hobbing and one of the supports being adapted to be moved relative to the other support to give relative lead movement to the work piece and tool, and one of the supports being adapted to be moved transversely relative to the direction of the lead movement to feed the tool relative to the work, and automatic means for effecting feed movement concurrently with lead movement, said means comprising a cam on the support which is movable to effect lead movement and movable therewith, a cam follower therefor, a push and pull bar on the other support movable to effect feed movement, a rack associated with the bar, a gear meshed with the rack, and connections between the cam follower and the gear to turn the gear to move the bar longitudinally.

2. In a hobbing machine, a work support, a work spindle on the support adapted to support a work piece, a tool support, a tool spindle on the tool support, a tool on the tool spindle, the tool and work spindles being adapted to be rotated at a relative velocity ratio suitable for hobbing and one of the supports being adapted to be moved relative to the other support to give relative lead movement to the work piece and tool, and one of the supports being adapted to be moved transversely relative to the direction of the lead movement to feed the tool relative to the work, and automatic means for effecting feed movement concurrently with lead movement, said means comprising a cam on the support which is movable to effect lead movement and movable therewith, a cam follower therefor, a push and pull bar on the other support movable to effect feed movement, a rack associated with the bar, a gear meshed with the rack, a second rack meshed with the gear and connected to the cam follower.

3. In a hobbing machine, a work support, a work spindle on the support adapted to support a work piece, a tool support, a tool spindle on the tool support, a tool on the tool spindle, the tool and work spindles being adapted to be rotated at a relative velocity ratio suitable for hobbing and one of the supports being adapted to be moved relative to the other support to give relative lead movment to the work piece and tool, and one of the supports being adapted to be moved transversely relative to the direction of the lead movement to feed the tool relative to the work, and automatic means for effecting feed movement concurrently with lead movement, said means comprising a cam on the support which is movable to effect lead movement and movable therewith, a cam follower therefor, a push and pull bar on the other support movable longitudinally to effect feed movement, a nut element threaded on the bar, manual means for rotating the nut element to move the bar longitudinally, a rotatable rack on the nut element, a gear meshed with the rotatable rack, and connections between the cam follower and the gear to turn it to move the nut element and thereby move the bar longitudinally.

4. In a hobbing machine, a work support, a work spindle on the support adapted to support a work piece, a tool support, a tool spindle on the tool support, a tool on the tool spindle, the tool and work spindles being adapted to be rotated at a relative velocity ratio suitable for hobbing and one of the supports being adapted to be moved relative to the other support to give relative lead movement to the work piece and tool, and one of the supports being adapted to be moved transversely relative to the direction of the lead movement to feed the tool relative to the work, and automatic means for effecting feed movement concurrently with lead movement, said means comprising a cam on the support which is movable to effect lead movement and movable therewith, a cam follower therefor, a push and pull bar on the other support which is movable to effect feed movement, a nut element threaded on the bar and rotatable to move the bar longitudinally, manual means for turning the nut element, a rack associated with the nut element, a gear meshed with the rack, and connections between the cam follower and gear to turn it to propel the rack and move the nut element and bar longitudinally, the associated rack and nut element being constructed to permit rotary movement of the nut element without disengaging the teeth of the rack and gear.

CHARLES H. SCHURR.